United States Patent [19]
Hagenow et al.

[11] Patent Number: 5,632,914
[45] Date of Patent: May 27, 1997

[54] MOTOR VEHICLE AIR BAG COVER HAVING A SKIN WITH A VIRTUALLY INVISIBLE TEAR SEAM FORMED BY MINIATURE HOLES

[75] Inventors: Paul Hagenow, Dover; John D. Gray, Union; Colin Frost, Dover, all of N.H.

[73] Assignee: Davidson Textron Inc., Dover, N.H.

[21] Appl. No.: 448,898

[22] Filed: May 24, 1995

[51] Int. Cl.[6] ................................................. B23K 26/00
[52] U.S. Cl. ........................ 219/121.71; 219/121.85; 280/739; 280/728.1
[58] Field of Search .................. 219/121.7, 121.71, 219/121.85, 121.73; 280/739, 737, 738, 728 R, 731

[56] References Cited

U.S. PATENT DOCUMENTS

| | | | |
|---|---|---|---|
| 4,465,919 | 8/1984 | Röder | 219/121 |
| 4,547,651 | 10/1985 | Maruyama | 219/121 |
| 4,851,061 | 7/1989 | Sorkoram | 156/63 |
| 5,058,413 | 10/1991 | Muddiman | 72/379.2 |
| 5,072,967 | 12/1991 | Batchelder et al. | 280/732 |
| 5,082,310 | 1/1992 | Bauer | 280/732 |
| 5,131,678 | 7/1992 | Gardner et al. | 280/732 |
| 5,211,084 | 5/1993 | Holliday et al. | 76/107.8 |
| 5,250,785 | 10/1993 | Blommel et al. | 219/121.72 |
| 5,316,822 | 5/1994 | Nishijima et al. | 428/138 |
| 5,348,339 | 9/1994 | Turner | 280/728 |
| 5,386,430 | 1/1995 | Yamagishi et al. | 372/57 |
| 5,410,125 | 4/1995 | Winston et al. | 219/121.69 |
| 5,478,111 | 12/1995 | Marchant et al. | 280/739 |

FOREIGN PATENT DOCUMENTS 4197849  11/1992  Japan.

*Primary Examiner*—Mark H. Paschall
*Attorney, Agent, or Firm*—Reising, Ethington, Barnard & Perry

[57] ABSTRACT

A cover for covering an air bag in a motor vehicle has a thin elastic plastic skin, a rigid substrate and an intermediate layer of soft plastic foam. The skin has a tear seam and the substrate includes a door that is impacted by the inflating air bag and presses outward against the foam layer and the skin to tear the foam layer and the tear seam and then swing outward with a torn section of the foam layer and skin to form an opening in the cover for deployment of the air bag into the passenger space in the vehicle. The tear seam in the skin is formed with extremely small laser machined holes that are not observable to a person of normal vision when viewed from a normal viewing distance in the passenger compartment by having a maximum hole size dimension at the outer side of the skin that does not exceed about 0.0005 inches. The array of holes are arranged in a prescribed tear seam pattern and relative to each other so as to reduce the tensile strength of the skin along the tear seam by not more than about 50 percent whereby the structural integrity of the skin is maintained prior to air bag inflation but then on the occurrence of the latter, the tear seam will assuredly tear from the force of the inflating air bag to form an opening therefor in the skin.

17 Claims, 2 Drawing Sheets

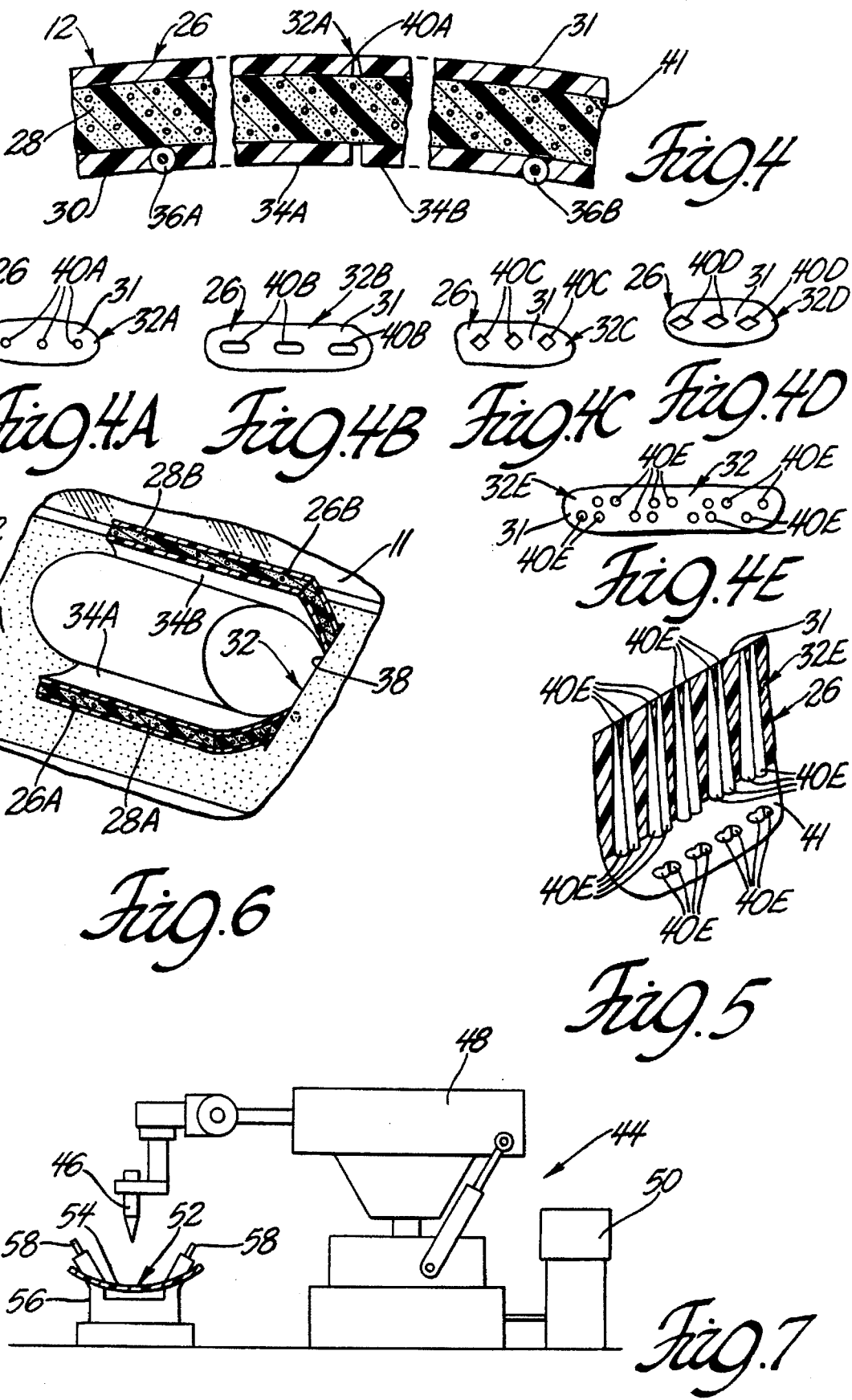

MOTOR VEHICLE AIR BAG COVER HAVING A SKIN WITH A VIRTUALLY INVISIBLE TEAR SEAM FORMED BY MINIATURE HOLES

TECHNICAL FIELD

This invention relates to motor vehicle air bag covers and more particularly to the formation of a virtually invisible tear seam in the skin of an air bag cover that tears from the force of air bag inflation to form an opening in the skin for deployment of the air bag.

BACKGROUND OF THE INVENTION

A common type of interior decorative trim panel or cover used to cover and hide the air bag in a motor vehicle comprises a thin elastic plastic skin having a non-glaring grained outer surface, a rigid retainer or substrate and an intermediate layer of soft plastic foam between the skin and substrate. The present invention relates to those covers wherein the skin is formed of a thermoplastic polymer or thermosetting resin and is provided with a tear seam, and the substrate includes one or more doors that are impacted by the inflating air bag and press against the foam layer and the skin to tear away a counterpart portion of the foam layer while also tearing the tear seam and then swing outward with the torn foam layer and a counterpart torn portion of the skin to form an opening in the cover for deployment of the air bag into a protective position in the passenger space. These tear seams are provided in various configurations or patterns with the most common having a C, H, U, or X-shape and wherein the pattern determines the number of doors required in the substrate.

It is desirable that the tear seam and thereby the presence of the air bag be hidden from view for various reasons and heretofore, this has been accomplished in several different ways. Such a tear seam is commonly referred to as an "invisible tear seam". One way of providing such an invisible tear seam is by forming a tear seam defining groove or series of depressions in the backside of the skin. This leaves a thin and thereby weakened section at the outer or appearance side of the skin that defines the tear seam without outwardly revealing its presence. Examples of such invisible air bag cover tear seams are disclosed in U.S. Pat. Nos. 5,072,967; 5,082,310; 5,316,822 and 5,348,339. The tear seam may be formed in the backside of the skin in various ways as is well known by those skilled in the art. For example, the tear seam may be formed in the backside of the skin with a so-called "hot knife" tool in the case of a powder cast or vacuum formed skin or with a tear seam forming feature in the mold tool for the skin's backside where the skin is compression or injection molded. Another way of forming an invisible air bag tear seam in the skin is to make the skin in a powder casting process and make the tear seam as a strip of a weaker like colored plastic material that is integrally joined with the skin in indistinguishable surface appearance relationship therewith as disclosed in U.S. Pat. No. 5,288,103. In the latter method, a tear seam defining gap is formed in the skin with a gasket that is pressed by a pattern against the mold surface of a heated shell tool while a thermoplastic powder is cast from a powder box against the mold surface and about the gasket to form the skin and this gap is then filled on the heated mold surface with the weaker plastic material to form the integral tear seam strip following removal of the gasket.

SUMMARY OF THE INVENTION

The present invention is a significant improvement over the above methods of forming a tear seam in a thin elastic thermoplastic or thermosetting plastic skin for an air bag cover and in particular offers cost effective manufacturing flexibility in that various prescribed tear seam patterns that are virtually invisible can be formed in similar or different air bag cover skins without the need for any change in the tear seam forming tooling, only the control thereof. This is accomplished in the present invention by forming the tear seam as an array or matrix of extremely small laser machined holes having a maximum hole size dimension at the non-glaring grained outer side of the skin that is no greater than about 0.0005 inches; it having been found that this hole size and smaller in the non-glaring grained outer surface makes the holes unobservable or invisible to a person with normal vision when viewed at a normal distance within the passenger space. The thin skin commonly has a controlled thickness of about 0.040 inches and this size of hole and even smaller in the contemplated skin is fully within the capability of an excimer laser; i.e. one that operates in the ultraviolet range. Furthermore, the laser provides the capability of forming the holes in various geometrical shapes including round, oval, square, diamond shaped, and elliptical.

The miniature holes are provided in their tear seam defining array or matrix with a density or spacing depending on their hole size that reduces the effective cross section of the skin along and across the tear seam and thereby the tensile strength of the skin at the tear seam by not more than about 50 percent which has been found to adequately maintain the structural integrity of the skin while sufficiently weakening same at the tear seam so that the latter will assuredly shear or tear from the typical force of air bag inflation. The holes may be arranged in the prescribed tear seam pattern in a single row to define the desired tear seam or they may be arranged in several parallel rows or in a random arrangement as an array or matrix of holes and wherein the larger the number of holes for a given tear seam pattern, the smaller the holes may be to produce the desired weakening and remain unobservable at distances closer than the normal viewing distance; i.e. remain unobservable even on unusually close eye inspection at a few inches distant.

In performing the laser machining of the tear seam holes, the air bag cover skin is firmly clamped in place in a fixture and a CNC (computerized numeric control) controlled excimer laser and a similarly controlled robot on which it is mounted are operated with program control so that the laser very precisely tracks the desired tear seam pattern on the skin at a prescribed distance therefrom and rapidly machines the required size and number of holes one after the other with the desired spacing. The tear seam hole pattern including its configuration, the size and shape of the holes, the spacing of the holes, and the number of holes is predetermined and the laser and robot controller is programmed accordingly and thus various tear seam hole patterns can be machined in similar and different skins at a single laser machining work cell. The miniature holes may be laser machined from either the appearance side or the backside of the skin with the latter accomplished prior to the formation of the foam layer thereagainst. The holes are formed by the laser with a taper that converges in the direction of machining and by machining from the backside, the holes are made smallest at the out or appearance side and can thereby be made as small as possible at the smallest hole size possible with the laser. In addition, several such robot mounted lasers or fixed lasers may be used in a single work cell to simultaneously machine certain sections of the tear seam to shorten the machining time.

It is therefore an object of the present invention to provide a new and improved tear seam in the skin of a motor vehicle air bag cover.

Another object of the present invention is to form a tear seam in the skin of a motor vehicle air bag cover with miniature holes that are invisible as normally viewed from a distance in the passenger compartment.

Another object of the present invention is to form a tear seam in the skin of a motor vehicle air bag cover with miniature holes that have a hole size dimension not greater than about 0.0005 inches at the appearance side of the skin so as to be invisible to a person of normal vision when viewed at and beyond a normal viewing distance in the vehicle.

Another object of the present invention is to provide a skin for a motor vehicle air bag cover having a tear seam formed with laser machined holes that are so small as to be invisible to a person of normal vision when viewed at and beyond a normal viewing distance in the vehicle.

Another object of the present invention is to provide a skin for an air bag cover having a virtually invisible tear seam formed by miniature laser machined holes that are machined from the backside of the skin so as to have a smallest dimension at the outer side of the skin.

Another object of the present invention is to provide a flexible method of manufacturing a virtually invisible tear seam in the skin of a motor vehicle air bag cover by forming the tear seam with miniature laser machined holes according to a tear seam pattern that can be readily varied by controlling the size and/or placement of the holes.

Another object of the present invention is to form a virtually invisible tear seam in the skin of a motor vehicle air bag cover by laser machining an array or matrix of miniature holes in the skin according to a prescribed tear seam pattern.

These and other objects, advantages and features of the invention will become more apparent from the following description and accompanying drawings wherein:

BRIEF DESCRIPTION OF THE DRAWINGS

FIG. 4 is an enlarged view of a portion of the instrument panel taken along the line 4—4 in FIG. 1 when looking in the direction of the arrows and wherein the tear seam defining holes are shown greatly exaggerated in size;

FIG. 4A is a view taken along the line 4A—4A in FIG. 3 when looking in the direction of the arrows and wherein one embodiment of the holes (i.e. round holes) forming the tear seam are shown greatly exaggerated in size;

FIG. 4B is a view similar to FIG. 4A showing another embodiment of holes (i.e. oval holes or slots) forming the tear seam;

FIG. 4C is a view similar to FIG. 4A showing another embodiment of holes (i.e., square holes) forming the tear seam;

FIG. 4D is a view similar to FIG. 4A showing another embodiment of holes (i.e., diamond shaped holes) forming the tear seam;

FIG. 4E is a view similar to FIG. 4A showing another embodiment of holes (i.e., rows of round holes) forming the tear seam;

FIG. 5 is a partial perspective view of just the skin in FIG. 4E as viewed from the backside thereof;

FIG. 6 is a view of the instrument panel in FIG. 1 showing the air bag being deployed though an opening created in the panel on tearing of the tear seam in the skin; and FIG. 7 is a diagramatic view of apparatus for forming the tear seam according to the present invention.

DETAILED DESCRIPTION OF THE DRAWINGS

Figure 1:
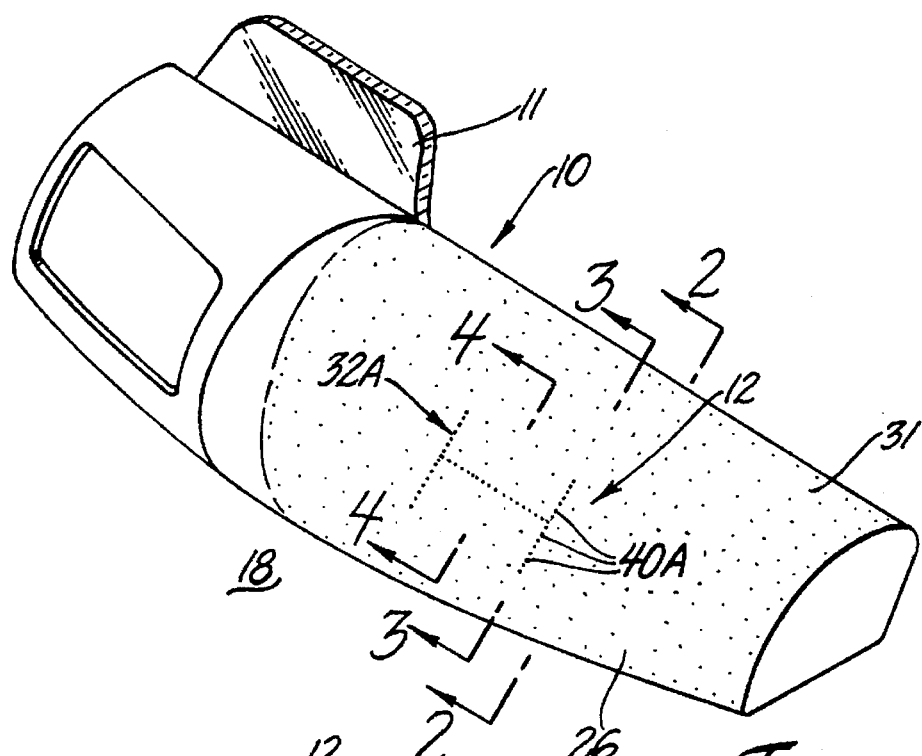
FIG. 1 is a perspective view of a motor vehicle instrument panel incorporating an air bag cover with a virtually invisible tear seam according to the present invention.
Figure 2:
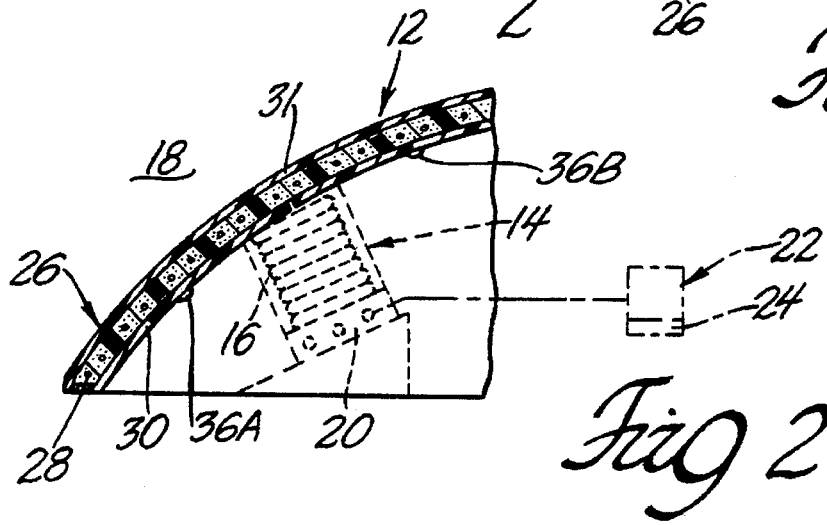
FIG. 2 is a view taken along the line 2—2 in FIG. 1 when looking in the direction of the arrows.

Referring to FIGS. 1 and 2, there is illustrated a motor vehicle instrument panel 10 that is located ahead of a windshield 11 and wherein a portion 12 of the panel on the passenger side forms a cover that normally covers and hides an air bag system 14. The air bag system is of a conventional type having an inflatable air bag 16 for protecting a front seat passenger seated in a passenger space 18. The air bag 16 is inflated by a gas generator 20 upon ignition in response to a signal from a controller 22 including a collision sensing device 24 as is well known in the art. The instrument panel 10 including the air bag cover 12 is a laminated structure comprising a thin soft elastic plastic skin 26, an intermediate soft plastic foam layer 28, and a rigid plastic retainer or substrate 30 with the latter providing stiffening support in the panel and means for securing the panel in place on the vehicle body structure.

The skin 26 has a mold produced non-glaring grained outer surface 31 and a uniform thickness of about 0.040 inches at least in the air bag covering area and may be formed of a suitable thermoplastic material such as vinyl, thermoplastic olefin (TPO), thermoplastic polyurethane (TPU) and polyvinyl chloride (PVC). The skin may also be formed of a suitable thermosetting plastic material such as spray urethane. The substrate 30 may be formed of a suitable thermoplastic material such as PVC and acrylonitrile-butadiene-styrene (ABS). The foam layer 28 is bonded to the skin and the retainer and may for example be a polyurethane (PU) foam. All of the above materials may be processed to form the respective panel components in a conventional manner that is well known by those skilled in the art.

Figure 3:
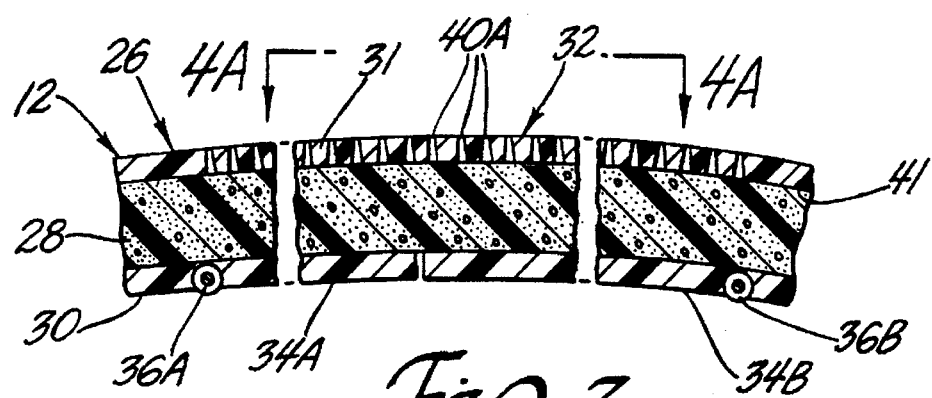
FIG. 3 is an enlarged view of a portion of the instrument panel taken along the line 3—3 in FIG. 1 when looking in the direction of the arrows and wherein the tear seam defining holes are shown greatly exaggerated in size.

For creating an opening in the air bag cover 12 for deployment of the air bag, the skin 26 is provided with a virtually invisible H-shaped tear seam 32A (shown as a dotted line in FIG. 1) and the substrate 30 is provided with a pair of doors 34A and 34B of plastic or metal that are attached with hinges 36A and 36B, respectively, to the retainer as shown in FIGS. 3 and 4. The hinged doors 34A and 34B are arranged so as to be impacted by the inflating air bag 16 and press outward against the foam layer 28 and the skin 26 to tear away counterpart portions 28A and 28B of the foam layer while also tearing the tear seam 32 as illustrated in FIG. 6. The doors 34A and 34B then swing outward with the torn foam layer portions 28A and 28B, respectively, and counterpart torn portions 26A and 26B, respectively, of the skin to form an opening 38 in the cover for deployment of the air bag into a protective position in the passenger space of the vehicle on the passenger side.

The tear seam 32A is formed in the skin 26 to a prescribed tear seam pattern (H-shape in the embodiment shown) by extremely small laser machined holes 40A that extend completely through the skin as shown in FIGS. 3 and 4 (the size of the tear seam defining holes being shown greatly exaggerated in these views because of their extremely small size). The penetrating holes may be formed in various shapes and arrays by laser machining. For example, the holes 40A forming the tear seam 32A are round holes as shown in the highly magnified view in FIG. 4A. A second embodiment of the tear seam identified as 32B and formed by oval shaped holes or slots 40B is shown in FIG. 4B. Stress sensitivity is concentrated in the tear seam 32B by arranging the long sides of the slots 40B parallel to the tear seam to promote tearing therealong. A third embodiment of the tear seam identified as 32C and formed by square holes 40C is shown in FIG. 4C. The corners of the square holes 40C add notch sensitivity (i.e., are stress raisers) and are arranged on a line in the tear seam pattern to concentrate stress along the seam to promote tearing. A fourth embodiment of the tear seam identified as 32D and formed by diamond shaped holes 40D is shown in FIG. 4D. The points of the diamond shaped holes 40D also add notch sensitivity and two of the points of these holes are arranged on a line in the tear seam pattern to concentrate stress along the seam to promote tearing. A fifth embodiment of the tear seam identified as 32E and formed by two rows of round holes 40E is shown in FIGS. 4E and 5. The tear seam holes 40A, 40B, 40C, 40D and 40E are located along the prescribed tear seam pattern and may comprise a single row of equally spaced holes that defines the tear seam as shown in FIGS. 4A, 4B, 4C and 4D, or may comprise an array or matrix of holes such as several parallel rows of holes as shown by the two rows of round holes 40E in the embodiment in FIGS. 4E and 5, or may comprise a random arrangement of unequally spaced holes that helps hide their presence. And it will be further understood that the holes in the above tear seam pattern embodiments could have some other suitable geometry such as an elliptical shape with its major axis arranged on a line in the tear seam and provided that whatever shape and hole array or matrix is chosen, the visual and structural objectives of the tear seam as described herein are met.

The typical cover for a passenger side air bag is normally located at a substantial distance in the passenger compartment from a person's eyes that is not less than about 15 inches and the tear seam 32 is made unobservable or invisible to a person having normal vision when viewed from a distance at and beyond this normal viewing distance in the passenger compartment by limiting the size of the penetrating holes in the skin (maximum hole size dimension) as measured at the non-glaring grained outer side 31 of the skin to no greater than about 0.0005 inches which is well within the machining capability of an excimer laser. In the case of the round holes, this dimensional limit relates to the diameter of the holes and in the case of the oval slots and elliptically shaped holes, this dimensional limit relates to the largest dimension there across and in the case of the square holes this dimension relates to that between diagonally opposite corners thereof and in the case of the diamond shaped holes, this dimension relates to that between the farthest spaced points of the diamond shape. The holes are arrayed along the tear seam pattern and provided in a size of about 0.0005 inches or less maximum hole size dimension and in a quantity and resulting spacing or density that reduces the cross section of the skin and thereby the tensile strength thereof along and across the tear seam by no more than about 50 percent wherein it was found that the tear seam in the thermoplastic or thermosetting material forming the skin will assuredly tear or shear there along from the typical force of air bag inflation but the structural integrity of the skin is sufficiently maintained to resist for example premature tearing of the tear seam by the inward pushing by a passenger in the air bag cover area that can incur in normal usage. And it will be understood that the tear seam thus formed by the holes is referred to herein as being virtually invisible because the holes do penetrate the skin and may be seen on unusually close eye inspection.

The miniature holes forming the tear seam may be laser machined from either the outer side 31 or the backside 41 of the skin with the latter machining accomplished prior to the formation of the foam layer thereagainst and the former machining capable of being accomplished either before or after the foam layer is in place. The holes are inherently formed by the laser with a taper (see FIGS. 3, 4 and 5) that converges in the direction of machining and by machining from the backside, the holes are made smallest at the outer side 31 and can thereby be made as small as possible at this side within the capability of the laser. For example, when the round holes 40A and 40E are laser machined from the backside as shown in FIGS. 3, 4, and 5, the holes may taper from a diameter of about 0.0020 inches at the backside 41 to a diameter of about 0.0005 inches at the outer side 31 when the skin is 0.040 inches thick. Furthermore, as seen in the tear seam embodiment in FIGS. 4E and 5, additional advantage can be taken of the tapered holes in very closely spacing the holes and obtaining the desired reduced tensile strength in the tear seam pattern in that one hole may be allowed to intersect with an adjacent hole at the backside of the skin (see FIG. 5) but still not intersect because of the taper with an adjacent hole at the important outer side (see FIG. 4E). And it will be further seen in FIG. 4E that there results a relatively small and large space between one hole and its two adjacent holes at the outer side in an alternating sequence along the tear seam pattern. And it will be further understood that such small spaces may be equal or vary in distance and also that such larger spaces may be equal or vary in distance.

Referring to FIG. 7, there is diagrammatically illustrated a CNC controlled laser machining work cell 44 for producing the above described tear seam embodiments. In the work cell, a machining laser 46 is mounted on a robot 48 and is controlled together with the robot by a programmable controller 50. The laser 46 is of the excimer type and is capable of machining holes of 0.0005 inches diameter and smaller in thermoplastic and thermosetting materials of about 0.040 inches thickness as above described. To illustrate the laser machining operation, an air bag cover skin 52 like that described above but without the tear seam, foam layer and retainer is firmly held in place with its backside 54 facing upward in a fixture 56 with clamps 58. The laser 46 is then manipulated by the robot 48 under programmed control by the controller 50 to track the desired tear seam pattern along the curvature of the skin at the backside thereof and dwell for a prescribed machining time at the desired hole locations while the controller 50 then also operates the laser with program control to machine the tear seam defining holes during the dwell times to thus form the desired tear seam pattern. Where the holes being machined are round holes, the laser remains stationary at the desired hole locations to effect their machining and where the holes are other than round, the laser is manipulated by the robot at the desired hole locations under programmed control to effect the desired hole geometry.

Preferably, the holes are machined from the backside of the skin as described above to take maximum advantage of the laser from the standpoint of the smallest size hole that it can machine in the skin as measured at the outer side thereof. Holes of the required small size at the outer skin side may also be laser machined from this outer side and in which case the air bag cover may be complete except for the formation of the tear seam. The laser in the latter case is only allowed to penetrate the skin and the holes are suitably spaced so as to not intersect with an adjacent one on the outer side as they can when machined from the backside.

A suitable excimer laser for machining the tear seam defining miniature holes described above is available from Lambda Physik Co. (a subsidiary of Coherent Inc.) The robot is preferably a 5 or 6-axis robot and is available from Fanuc Robotics North American Inc, The robot may also be a two-axis gantry/table type. The controller for the laser and the robot is also of a suitable conventional type and the programming of the controller to operate the robot and laser is well within the skill in the art given the above specifications for the holes, the contour of the particular skin and the desired tear seam pattern. And since the tear seam pattern can be readily changed by the programming of the controller, there is provided a very cost effective flexible manufacturing method wherein different tear seam patterns for different or identical skins can be machined in the same work cell by simply calling up the individual program therefor.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. For example, a similar or different form of air bag cover having a skin with a suitable tear seam pattern made according to the invention could also be used to cover an air bag unit mounted at some other suitable location in the front or rear of the passenger compartment. For further example, an H-shaped tear seam pattern has been chosen to illustrate the invention but other tear seam patterns such as those with a C, U and X shape may be similarly formed in accordance with the above tear seam hole teachings and with a suitable door or doors provided in the substrate. It is therefore to be understood that within the scope of the appended claims, the invention may be practiced otherwise than as specifically shown and described.

What is claim is:

1. A method of forming a virtually invisible tear seam in an elastic plastic skin of a cover for an air bag wherein the tear seam is adapted to be torn by the force of the air bag on air bag inflation to form an opening in the skin for deployment of the air bag, said method comprising the steps of:

prescribing a tear seam pattern for the skin; and laser machining an array of miniature penetrating holes in the skin in the prescribed tear seam pattern having a maximum hole size dimension at the outer side of the skin that does not exceed about 0.0005 inches and in a number and with spacing therebetween that reduces the tensile strength of the skin along the tear seam pattern by not more than about 50 percent to thereby form a virtually invisible tear seam in the skin.

2. The method of claim 1 further comprising the step of forming the holes by laser machining from a backside of the skin.

3. The method of claim 1 further comprising the step of forming the holes by laser machining from a backside of the skin whereby the holes resultantly taper from a smallest hole size dimension located at the outer side of the skin to a largest hole size dimension located at the backside of the skin.

4. The method of claim 1 further comprising the step of forming the holes by laser machining from the outer side of the skin.

5. The method of claim 1 further comprising the step of forming the holes in at least one row along the tear seam pattern.

6. The method of claim 1 further comprising the step of forming the holes in a plurality of side by side rows along the tear seam pattern.

7. The method of claim 1 further comprising the step of forming the holes with equal size spaces between adjacent ones of the holes.

8. The method of claim 1 further comprising the step of forming the holes with at least two different size spaces between adjacent ones of the holes.

9. A method of forming a virtually invisible tear seam in an elastic plastic skin of a cover for an air bag wherein the tear seam is adapted to be torn by the force of the air bag on air bag inflation to form an opening in the skin for deployment of the air bag, said method comprising the steps of:

prescribing a tear seam pattern for the skin; and laser machining an array of miniature penetrating holes in the skin in the prescribed tear seam pattern having a maximum hole size dimension at the outer side of the skin that does not exceed about 0.0005 inches and in a number and with spacing therebetween that reduces the tensile strength of the skin along the tear seam pattern by not more than about 50 percent to thereby form a virtually invisible tear seam in the skin;

the holes being formed by laser machining from a backside of the skin whereby the holes resultantly taper from a smallest hole size dimension located at the outer side of the skin to a largest hole size dimension located at the backside of the skin, and spacing the tapered holes so that one hole intersects with an adjacent hole at the backside of the skin but not with another hole at the outer side of the skin.

10. The method of claim 1 further comprising the step of forming the skin of a thermoplastic material.

11. The method of claim 1 further comprising the step of forming the skin of a thermosetting plastic material.

12. The method of claim 1 further comprising the step of forming the holes with a round shape.

13. The method of claim 1 further comprising the step of forming the holes with an oval shape.

14. The method of claim 1 further comprising the step of forming the holes with an elliptical shape.

15. The method of claim 1 further comprising the step of forming the holes with a square shape having corners arranged on a line in the tear seam pattern.

16. The method of claim 1 further comprising the step of forming the holes with a diamond shape having points arranged in a line in the tear seam pattern.

17. An elastic plastic skin for an air bag cover having a virtually invisible tear seam made according to the method of any one of the above claims.

* * * * *